United States Patent [19]

Strickland

[11] 4,138,238

[45] Feb. 6, 1979

[54] METHOD AND APPARATUS FOR PRODUCING MOLTEN GLASS

[76] Inventor: Edward T. Strickland, 1011 Anchorage La., Box 6529, San Diego, Calif. 92106

[21] Appl. No.: 785,845

[22] Filed: Apr. 8, 1977

[51] Int. Cl.² ........................... C03B 5/02; C03B 3/00
[52] U.S. Cl. ........................... 65/134; 65/335; 65/347
[58] Field of Search ............ 65/337, 346, 347, 18, 65/335, 134, DIG. 4; 425/129 R

[56] References Cited

U.S. PATENT DOCUMENTS

| | | | |
|---|---|---|---|
| 433,254 | 7/1890 | Niles | 65/95 |
| 1,954,732 | 4/1934 | Gossler | 13/6 |
| 2,215,982 | 9/1940 | Slayter | 65/1 X |
| 2,244,267 | 6/1941 | Slayter | 65/12 X |
| 2,692,296 | 10/1954 | De Piolenc et al. | 65/11 X |
| 2,960,723 | 11/1960 | Stark | 65/13 |
| 3,049,754 | 8/1962 | Frickert | 65/11 UX |
| 3,200,444 | 8/1965 | Davis | 425/129 X |
| 3,257,181 | 6/1966 | Stalego | 65/2 |
| 3,328,149 | 6/1967 | Keefer | 65/168 |
| 3,479,167 | 11/1969 | Ashman | 65/134 X |
| 3,489,542 | 1/1970 | Schuller | 65/2 |
| 3,573,014 | 3/1971 | Strickland | 65/1 |
| 3,810,741 | 5/1974 | Stalego | 65/11 X |
| 3,920,429 | 11/1975 | Stalego | 65/1 |
| 3,926,600 | 12/1975 | Stalego | 65/1 |
| 3,944,713 | 3/1976 | Plumat et al. | 65/134 X |
| 4,046,540 | 9/1977 | Lewis et al. | 65/18 |

*Primary Examiner*—Arthur D. Kellogg

[57] ABSTRACT

Substantially gas free raw materials are melted to form molten glass by urging a bed of particulate materials toward a resistance heating member. The solid materials are urged into close proximity with the resistance heater and, at most, a thin film of molten glass is maintained on the heater plate. The heater plate contains one or more passages through which the molten glass flows into a heated reservoir in which the glass achieves the requisite homogeneity.

13 Claims, 6 Drawing Figures

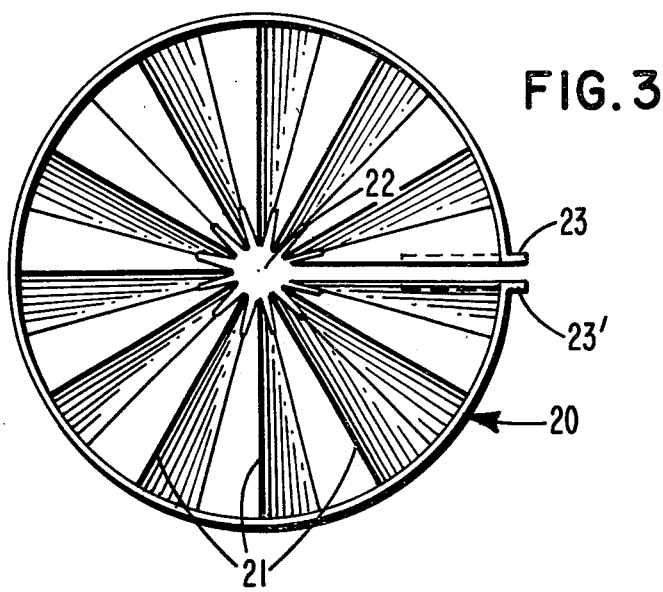
FIG.3
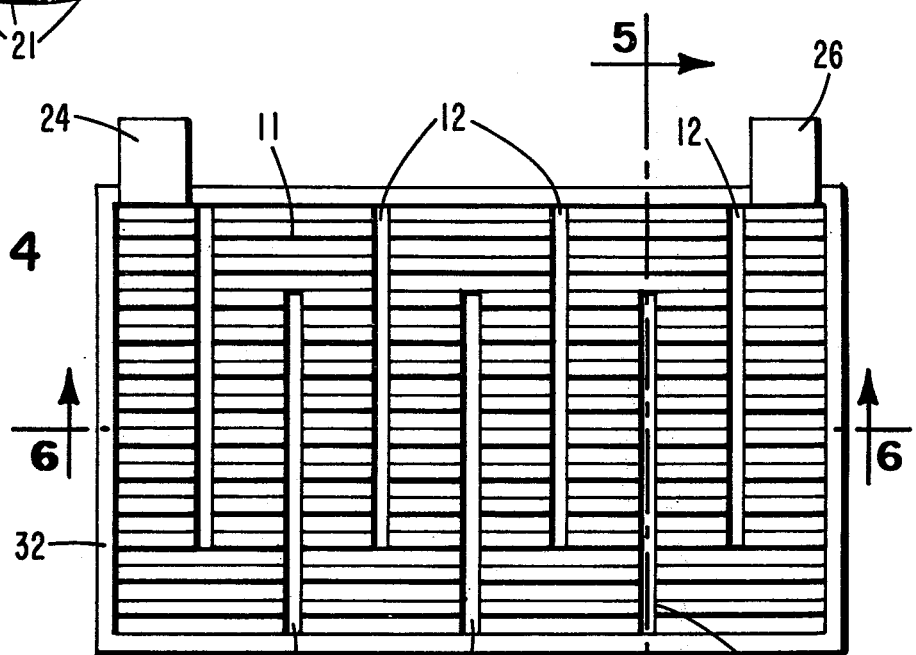
FIG.4
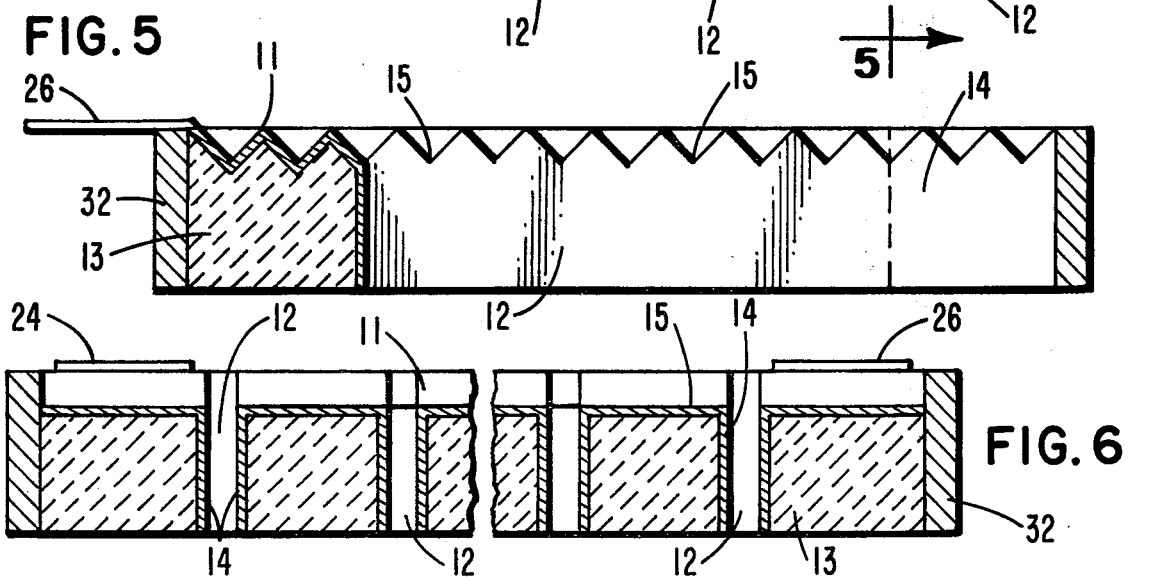
FIG.5
FIG.6

METHOD AND APPARATUS FOR PRODUCING MOLTEN GLASS

BACKGROUND OF THE INVENTION

This invention relates to the formation of molten glass from glass-forming raw materials.

The formation of molten glass suitable for the production of glass fibers, or the like, has been the subject of considerable research and development. Present day glass melters range from large gas-fired melters to relatively small melters heated by electrodes, or wall or submerged resistance heaters. The energy input to the glass melter is a matter of obvious concern since it directly affects the economics of any glass product. The size and complexity of a melter is also of concern since these also affect economics through capital costs, restrictions on location and the like. Beyond economics, however, the glass melter must be capable of providing a homogeneous molten glass substantially free of gas bubbles or other irregularities.

It is an object of this invention to provide a method and apparatus for producing molten glass characterized by efficient conductive heat transfer.

It is another object of this invention to provide a method and apparatus for producing molten glass characterized by efficient radiation heat transfer.

It is yet another object of this invention to provide a method and apparatus for producing molten glass characterized by efficient convective heat transfer.

It is still another object of this invention to provide a method and apparatus for rapidly melting glass-forming materials to provide molten glass.

It is a further object of this invention to provide a method and apparatus for producing molten glass which minimizes the size of the melter required.

It is a still further object of this invention to provide for the production of molten glass with an apparatus that may be provided at relatively small capital expense.

It is an additional object of this invention to provide a method and apparatus providing efficient energy utilization and suitable for economically producing a homogeneous molten glass.

In one aspect this invention contemplates the method of melting glass-forming materials comprising:

(a) establishing a bed of particulate substantially gas-free glass-forming materials;

(b) urging said particulate materials into close proximity with a resistance heating member, said heating member having at least one outlet for molten glass;

(c) melting said glass-forming materials with heat transmitted from said resistance heating member to form molten glass;

(d) maintaining only a thin film of molten glass on said heating member;

(e) flowing said molten glass through said outlet; and (f) collecting said molten glass in a heated reservoir having a gas space over the molten glass.

In another aspect, this invention contemplates an apparatus for carrying out the described method.

By maintaining the raw material charge in virtual contact with the resistance heater, heat transfer from the heater occurs very efficiently; and a resistance heater itself is one of the most efficient electrical heating means. The present invention eliminates a thick layer of molten glass overlying the primary heater and thereby eliminates the heat transfer inefficiencies that accompany the presence of such a layer. Since the charge is in close proximity with the heater, very efficient conductive heat transfer is achieved. Moreover, the absence of a thick layer of molten glass, with its entrained bubbles, between the batch and the heater materially improves radiation penetration into the batch. Finally, the thin layer of molten glass, with entrained bubbles, flows along the heater face and in contact with the particles of the oncoming batch and improves convective heat transfer.

The glass-forming materials which are melted flow across the surface of the resistance heater and then flow to a heated reservoir. The rapid flow of the glass as a relatively thin film across the heater assists in achieving a mixing of the components of the glass and, to some extent, converts dissolved gas into gas bubbles within the molten glass. The molten glass flowing from the resistance heater into the reservoir contains gas bubbles but has relatively little dissolved gas. The final solution of fine particles of batch, the final release of gas bubbles and the final achievement of requisite homogeneity occur in the reservoir after the glass has left the resistance heater or melter. The glass in the reservoir has less than normal amounts of dissolved gas. In the event that small seeds are entrained in the glass leaving the reservoir, they will quickly be absorbed into solution by the glass as the temperature of the glass is reduced, thereby providing an essentially seed-free glass.

The heat from the melter is employed for the specific purpose of efficiently and rapidly bringing the batch to the requisite temperature to react and melt the glass-forming materials. The fining of the glass and the completion of the eutectic formation occurs in a reservoir out of contact with the melter, and out of contact with and view of the unmelted charge. Since the molten glass entering the reservoir is already at substantially the requisite temperature, only very small amounts of additional heat, essentially due to insulation losses, are required in the reservoir to maintain the temperature of the molten glass.

Since melting does occur rapidly and efficiently, relatively small melters may be employed according to this invention to service a plurality of glass fiber drawing stations, glass article forming stations, or the like, thereby substantially reducing capital investment. Relatively small efficient melters not only reduce costs substantially but they also provide a manufacturer with substantial freedom of choice regarding location.

The make up of the glass-forming materials obviously will vary depending upon the particular product desired. E glass, for example, is a very common glass employed for glass fibers, and has the following typical composition:

55.2% $SiO_2$; 0.3% $F_2$
18.7% $CaO$; 0.3% $Na_2O$
14.8% $Al_2O_3$; 0.2% $K_2O$
7.3% $B_2O_3$; 0.3% $Fe_2O_3$

The raw materials which are employed to form E glass, or other types of glass, are well known in the art and the choice of such materials is easily within the skill of the routineer. Other glasses for glass fibers, for example, A glass, C glass, S glass and glasses for other purposes are well known in the art as are the raw materials which may be employed for such glasses.

In order to promote homogeneity and rapid melting of the charge, it is generally preferred that the glass-forming materials be of a relatively small size. For example, substantially minus 100 mesh (Tyler mesh size)

or smaller glass batch readily may be employed. Desirably the components of the charge are well mixed to provide rapid melting and homogeneity. While this specification speaks of glass melting, it should be understood that exothermic and endothermic reactions of raw materials take place during the melting process. The term "melting," as employed herein and as commonly employed in the art, embraces all aspects of the melting process.

Unlike the common prior art glass melting processing, the raw materials for the practice of this invention should be substantially gas-free. Raw materials containing, for example, carbonates, water, combined or mechanical, or sulfur dioxide, liberating components can readily be rendered substantially gas-free merely by preheating or calcining. Calcination temperatures are once again well known to the art. The raw materials ae substantially gas-free in order to avoid a rapid and unmanageable generation of gas during melting. In the present invention, the charge moves toward the melter essentially as a unified body. Excessive gas formation at or near the melter can disrupt the integrity of the batch and can greatly reduce the efficiency of the melting process. Small amounts of gas, including the gas in the interstices between the particles of the charge, can be tolerated without disrupting the process of this invention.

The resistance heater should achieve a temperature of at least about 2600° F., with temperatures of from about 2900° F. to about 3100° F. being particularly preferred. These temperatures are generally applicable to most common types of glass including those identified above. In the event pure silica or other high temperature glasses are processed, higher temperatures will be employed for the resistance heater. Generally, the hotter the temperature of the resistance heater the more rapid the melting and fining that can be achieved.

The choice of the material for the resistance heater is readily within the skill of the art. With a platinum resistance heater, heater temperatures up to about 3000° F. may be employed. If an 80:20 platinum-rhodium alloy is utilized for the resistance heater, temperatures up to about 3200° F. may be employed. Other alloys are also well known, as is the appropriate maximum temperatures for such alloys.

In order to withstand the forces applied according to the practice of this invention, the heater must be so constructed so that it will maintain its configuration and not be subject to significant distortion, including creep. This can be accomplished by a proper choice of metal or alloy and structure. More preferably, the heating element is employed in combination with a refractory support member which provides the requisite strength. So long as the temperature control system employed is sufficiently accurate, the temperature of an alloy or metal can be within about 50° F. of its melting point.

The substantially gas-free raw materials are maintained in close proximity with the resistance heater in order to achieve the rapid and efficient melting according to the present invention. The lower temperature melting particles will melt without contacting the heater. The high temperature melting particles will be urged nearer the heater and some may make actual contact before complete melting occurs.

As the raw materials move toward the resistance heater, they move essentially as a single body. Due to the insulating nature of the material, coupled with the rate of movement toward the resistance heater, significant heat penetration into the batch from the resistance heater will be confined to a zone that is relatively near the resistance heater. As the batch moves toward the heater it will change from a solid batch to a batch that is predominately solid but contains some molten material and then to a batch that is predominately molten but contains some solids. This transition zone should not be more than about ⅛ inch and preferably not more than about ¼ inch from the heater. The predominately liquid zone should not be more than about 1/16 inch and preferably not more than about 1/32 inch from the heater.

The force applied to the glass-forming materials obviously will be a function of equipment design, heater configuration, operating parameters, and the like. While pressures of about 1 or 2 psi may be sufficient in some cases, pressures of from about 3 to about 10 psi or more will be more often employed and are more desirable. The requisite force can be applied to the batch to urge it against the heater surface through use of a screw conveyor, piston, plunger or other mechanical means. It is also possible to employ a sufficiently high column of batch to achieve the requisite force through gravity. Generally the column of batch, for gravity operation, will be at least about 3 feet and desirably at least about 9 feet.

The thickness of the predominately molten phase or zone can be controlled by and will be a function of, inter alia, the force applied by the batch moving toward the heater, the temperature of the resistance heater, the number and location of passages in the resistance heater through which the molten glass may flow into the heated reservoir, the slope of the resistance heater, and the like. The outlets from the resistance heater for the molten glass should not be of such width or diameter as to allow any significant amount of charge at a temperature less than about 50° F. below the heater temperature to drop directly into the heated reservoir. The charge, particularly as it becomes hot upon approaching closely to the resistance heater, demonstrates some cohesiveness so that slots may have a width of about ⅛ inch. Similarly, holes may have a diameter of about ⅛ inch. The maximum width or diameter of the passages readily may be determined for each operation.

The melted molten glass flows from the resistance heater into a molten glass reservoir which will be sometimes referred to herein as an atrium. The atrium is provided with heating means but, in a well insulated apparatus, very little heat input will be required since the purpose of the heat input is merely to maintain the molten glass at proper temperatures. Generally, the glass will be maintained at temperatures of at least about the temperature of the incoming glass which, as noted above, will generally be at least about 2600° F. and desirably between about 2900° F. to about 3100° F. or hotter. During the residence time in the atrium, gas bubbles which may be entraped in the molten glass will be dissipated. In addition, small particles of unmelted material will go into solution and their components will disperse in the molten glass, so that the molten glass will achieve the requisite batch free homogeneity. Generally glass retention times in the heated reservoir will range from about 10 minutes to about 60 minutes.

The invention may be better understood by reference to the attached drawings.

FIG. 3 is a plan view of an alternate configuration of a conical resistance heater which may be employed with the apparatus of FIG. 1;

FIG. 4 is a plan view of an alternate configuration of a resistance heater;

FIG. 5 is an enlarged elevation view taken along lines 5—5 of FIG. 4; and

FIG. 6 is an elevation view taken along lines 6—6 of FIG. 5.

Figure 1:
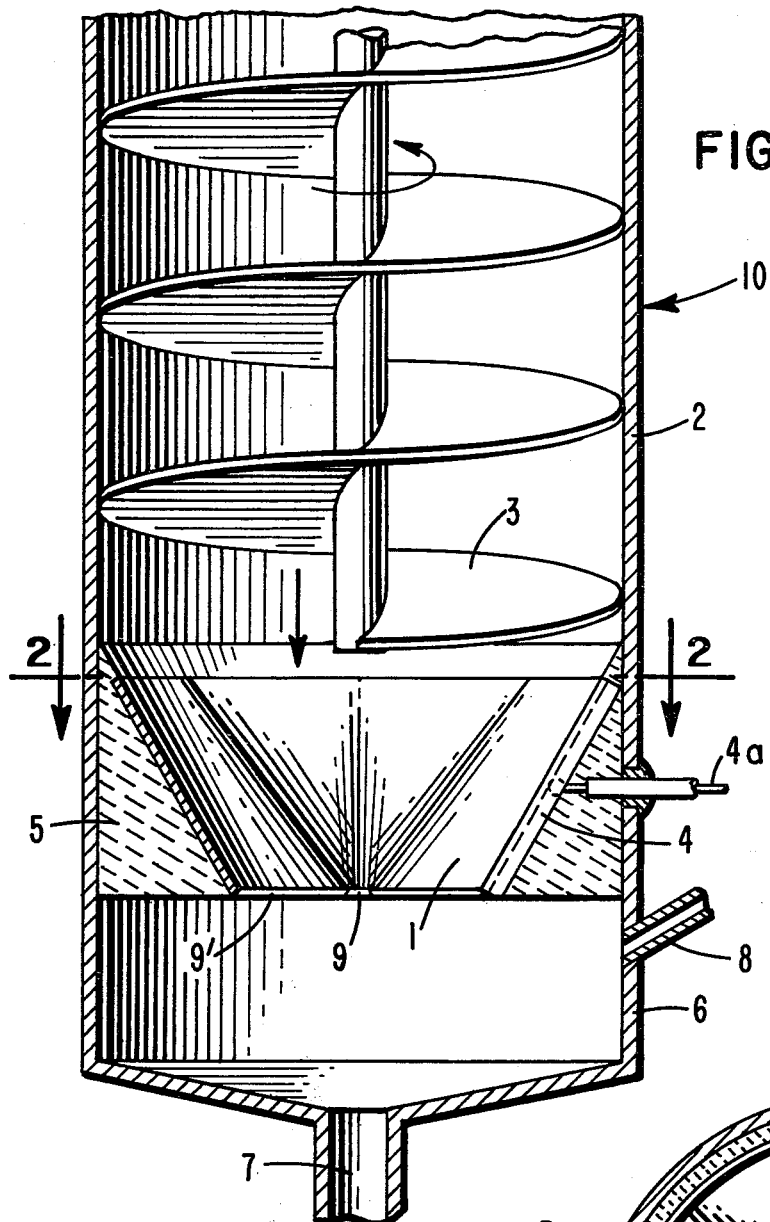
FIG. 1 is a schematic cross-sectional elevation and a glass melter according to this invention.

In FIG. 1 the apparatus 10 includes a hopper 2 overlying and in communication with resistance heater 1. The resistance heater is supported by ceramic supporting means 5 and overlies heated reservoir 6.

In order to maintain a close proximity between the particulate glass-forming materials and the resistance heater, a screw conveyor is schematically shown as 3. It will be understood that other mechanical means for maintaining close contact can also be employed including, without limitation, a plunger, piston, or the like. If desired, the hopper may include heating means to preheat the outer surface of the charge, for example, to about 2000° F. If a screw conveyor is employed and the sides of the hopper are heated, flutes or other arrangements may be employed to avoid having the batch merely rotate with the screw conveyor. Such situation would not be encountered if a plunger or piston is employed. Since the hopper itself does not reach very high temperatures, a variety of materials, all well known in the art, are available for its construction. Steel or stainless steel can be employed, if desired.

Figure 2:
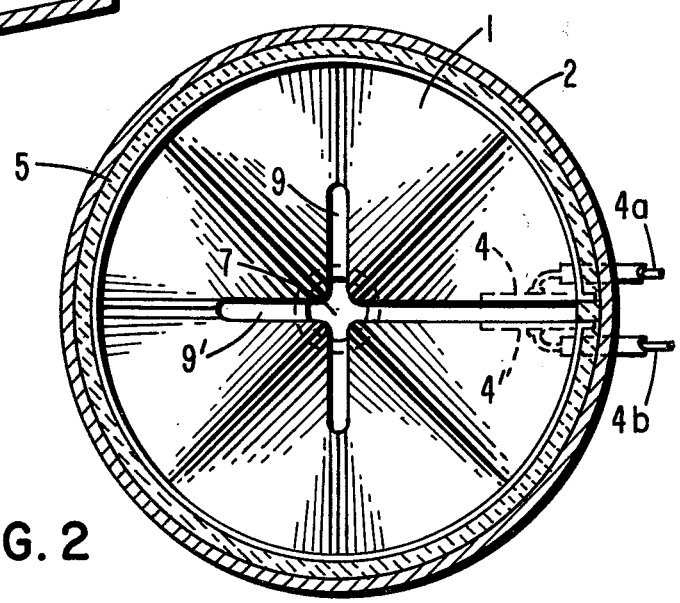
FIG. 2 is a plan view of the resistance heater taken along lines 2—2 of FIG. 1.

The resistance heater 1 as shown in FIGS. 1 and 2 contains flanges 4 and 4' for electrical power connections 4a and 4b. The space between the flanges is filled with electrical insulating material, such as a ceramic or the flanges may be cooled with a cooling tube or the like so that the space between the flanges becomes filled with solid glass.

The resistance heater may be formed from a strip of metal which is rolled and then has one end crimped without drawing to provide the slots 9 for passage of molten glass as shown in FIG. 2. In order to avoid hot spots, the current flow should be maintained substantially uniform throughout the resistance heater. This may be accomplished, as shown in FIGS. 1 and 2, by employing a strip having a substantially uniform thickness and width (for example, 0.03 in. by 4 in. by 14 in.) and forming the heater therefrom. In the embodiment shown, the current path adjacent the outlet slots 9 and 9' are essentially the same length as the current flow around the upper periphery of the resistance heater. If the length of the path of current flow varies along the resistance heater as encountered, for example, in a smooth cone, substantially constant resistance paths may nevertheless be maintained substantially uniform by appropriately varying the thickness of the resistance heater.

While FIGS. 1 and 3 depict a resistance heater having four corrugations and two outlet slots 9 and 9' at right angles to each other for the passage of molten glass, it should be understood that a plurality of corrugations may also be employed. One such alternate, with a plurality of corrugations and outlet slots, is shown in the plan view of FIG. 3 in which heater 20 has a plurality of corrugations 21 and outlet slots 22. Flanges 23 and 23' are provided for electrical power connections.

As noted earlier, the material chosen for the resistance heater will vary depending upon the glass to be formed. For E glass an alloy of 80% platinum and 20% rhodium is entirely satisfactory and is well known in the art. The thickness of the resistance heater again will vary somewhat depending upon the specific application, but thicknesses ranging from about 0.005 to about 0.05 inches generally will be employed and thickness ranging from about 0.01 inches to about 0.03 inches are preferably employed.

Since the resistance heater will frequently be operated near its melt temperature, and must withstand the force of the glass-forming materials being urged toward it, the heater, as shown, is supported by a ceramic support member 5. Other support means may also be employed. A variety of high temperature ceramic materials are known in in the art and may be employed. Zirconia casting cement, for example, has been successfully employed in the practice of this invention. Casting is particularly useful since an intimate fit results between the heater and its support.

The heated reservoir or atrium 6 is formed of a metal which is suitable for use with molten glass. Desirably it will have a sloped bottom and be fully supported since vertical walls at the temperatures prevalent in the reservoir may collapse under their weight. Once again, the common 80:20 platinum-rhodium alloy may be employed. The atrium itself may be used as a resistance heater or separate heating means may be located within or around the atrium. Since the glass entering the atrium is already molten and very hot, the atrium heating means need supply only a very small amount of maintenance heat.

Since the atrium is employed, inter alia, to permit gas bubbles entrained in the molten glass from the resistance heater to escape, it is provided with a gas outlet schematically shown as 8, FIG. 1. The outlet is desirably heated to avoid condensation of off-vapors. In addition, a liquid outlet schematically shown as 7 is provided from the atrium. The glass outlet means may, of course, be heated and provided with flow control means if desired.

Another alternate configuration for a resistance heater is shown in FIG. 4. In FIG. 4 the resistance heater 11 is serpentine in configuration, is provided with passages 12 through which molten glass may pass, and is surrounded by casing 32. While not essential, the resistance heater 11 may be corrugated as shown in FIGS. 4, 5 and 6 in order to increase the surface of the heater and to provide natural channels through which molten glass may drain into passages 12. The resistance heater 11 is equipped with flanges 24 and 26 for connection to electrical conductors.

The resistance heater 11 has corrugations 15 and is supported by ceramic support means 13 as shown in FIGS. 5 and 6. Since molten glass will flow down the sides of ceramic support means 13, those sides are desirably lined with additional metal strips 14. Although the heater of FIG. 4 has passages for molten glass through the heater, it should be understood that, as an alternate, the passages for molten glass may be provided around the edges of the heater.

While FIGS. 1 and 2 depict a heater having a circular configuration and FIG. 4 depicts a heater having a rectangular configuration, it should be understood that the apparatus may have any desired cross-sectional configuration with the resistance heaters designed to conform to that configuration. In addition, the entire apparatus should be insulated to minimize heat loss.

In operation of the apparatus of FIG. 1, particulate gas-free glass-forming materials in hopper 2 are urged toward resistance heater 1 by screw conveyor 3. The resistance heater 1 is maintained at a temperature of at least 2600° F. by electrical power connected to flanges 4 and 4'. The glass-forming materials which come into close proximity with resistance heater 1 become molten and a thin film of molten material flows downwardly along resistance heater 1 through slots 9 and 9' into atrium 6. Atrium 6 is heated by heating means (not shown) to maintain a temperature of at least about 2600° F. The atrium is partially filled with molten glass which, during operation of the apparatus, will have an overlying thin layer of foam. As the foam breaks up the gas exits from reservoir 6 through gas exit 8. The residence time in the reservoir, generally from about 10 to about 60 minutes, can be achieved by proper selection of reservoir size according to principles well known in the art. Molten glass is removed through glass outlet 7. The apparatus can be operated either on a continuous basis or a batch basis.

Since the above embodiments are illustrative only and since modifications of this invention will be apparent to those skilled in the art, it is intended that this invention be limited only by the scope of the pending claims.

I claim:

1. The methd of melting glass-forming materials comprising:
    (a) establishing a bed of particulate substantially gas-free glass-forming materials;
    (b) urging said particulate materials with a force of at least about 1 lb. per square inch into close proximity with a resistance heating member, said heating member being at a temperature of at least about 2600° F. and having at least one outlet for molten glass;
    (c) melting said glass-forming materials with heat transmitted from said resistance heating member to form a molten glass;
    (d) flowing said molten glass through said outlet at a rate to maintain only a thin film of molten glass on said heating member; and
    (e) collecting said molten glass in a heated reservoir having a gas space over the molten glass.

2. The method of claim 1 wherein said resistance heater is at a temperature of from about 2900° F. to about 3100° F.

3. The method of claim 1 wherein the molten glass in the reservoir is at a temperature of at least about 2600° F.

4. The method of claim 1 wherein said particulate materials are urged toward the resistance heating member with a force of at least about 3 lbs. per square inch.

5. The method of claim 1 wherein the particulate materials are urged by mechanical means toward the resistance heating member.

6. The method of claim 1 wherein the transition zone in which the solid batch begins to change to molten material is not more than about ½ inch from said resistance heater member.

7. The method of claim 1 wherein the transition zone in which the solid batch begins to change to molten material is not more than about ¼ inch from said resistance heater member.

8. An apparatus for melting glass-forming materials comprising:
    (a) container means for glass-forming materials in communication with a resistance heating member, said heating member having at least one outlet for molten glass;
    (b) mechanical means for urging the particulate glass-forming materials toward said resistance heating member; and
    (c) molten glass reservoir means adjacent to said resistance heating member and in communication with said outlet of resistance heating member, said reservoir having a gas outlet in the upper portion thereof and a molten glass outlet in the lower portion thereof.

9. The apparatus of claim 8 wherein the resistance heating member is corrugated.

10. The apparatus of claim 8 wherein the resistance heating member is cone shaped and is corrugated.

11. The method of claim 1 wherein the resistance heating member is corrugated.

12. The method of claim 1 wherein the resistance heating member is cone shaped and is corrugated.

13. The apparatus of claim 8 wherein said resistance heating member is supported by a refractory support member.

* * * * *